United States Patent [19]

Miller

[11] Patent Number: 5,423,344
[45] Date of Patent: Jun. 13, 1995

[54] GAS BLANKETED LIQUID STORAGE SYSTEM, GAS PRESSURE REGULATION DEVICE, COUNTERSPRING REGULATOR AND PROCESS FOR GAS BLANKETING A LIQUID STORAGE VESSEL

[76] Inventor: Robert S. Miller, P.O. Box 8577, So. Charleston, W. Va. 25308

[21] Appl. No.: 187,976

[22] Filed: Jan. 28, 1994

[51] Int. Cl.$^6$ ............................................. G05D 16/00
[52] U.S. Cl. .................................... 137/209; 137/489; 137/505.13; 137/505.47
[58] Field of Search .................... 137/209, 489, 505.13, 137/505.46, 505.47

[56] References Cited

U.S. PATENT DOCUMENTS

| | | | |
|---|---|---|---|
| 389,032 | 9/1888 | Westinghouse | 137/505.13 |
| 843,174 | 2/1907 | Reynolds | 137/489 |
| 1,611,263 | 12/1926 | Bihl | 137/505.46 |
| 1,982,045 | 11/1934 | Clithero et al. | |
| 2,071,871 | 2/1937 | Cleveland | 137/489 X |
| 2,198,070 | 4/1940 | Wile | |
| 2,627,703 | 2/1953 | Spencer | |
| 2,690,760 | 10/1954 | Hughes | 137/489 X |
| 2,707,970 | 5/1955 | Hughes | 137/489 |
| 2,720,887 | 10/1955 | Safford | |
| 2,774,374 | 12/1956 | Schneider | |
| 2,890,713 | 6/1959 | Semon | |
| 3,405,551 | 10/1968 | Halasz | |
| 3,545,471 | 12/1970 | Taplin | |
| 3,601,148 | 8/1971 | Jeffrey | |
| 4,274,440 | 6/1981 | Richard, Jr. | 137/489 X |
| 4,947,815 | 8/1990 | Peter | |
| 4,972,868 | 11/1990 | Davis et al. | |

FOREIGN PATENT DOCUMENTS

| | | | |
|---|---|---|---|
| 105445 | 10/1938 | Australia | 137/505.46 |
| 124143 | 8/1931 | Austria | 137/505.46 |

OTHER PUBLICATIONS

Fisher Controls, Nov. 1991, one page.

*Primary Examiner*—Robert G. Nilson
*Attorney, Agent, or Firm*—Spencer D. Conard

[57] ABSTRACT

A system, device, regulator and process for gas blanketing under precise gas pressure control is provided herein exhibiting extreme pressure sensitivity, position flexibility, smooth gas shutoff, for regulating the pressure of liquid storage vessels having vapor phases therein, and optionally being useful for gas blanketing of other units requiring positive gas pressures therein, such as pressurized rooms, duct, housings, such as computer housing, and the like, at pre-selected pressures of between 0.01 inches of water column and 15 inches of water column, with pressure sensitivities responsive to pressure changes of 0.01 inches of water column within a predetermined pressure set point. The system is compact, self contained, and requires no external source of power other than the supply pressure, which can range from about 10 psig to 1,000 psig. The system, device and regulator are not position sensitive, and may be properly operated in any orientation. The system, device and regulator are also resistant to clogging and have a minimum number of parts thereby minimizing cost and the risk of part failure.

9 Claims, 2 Drawing Sheets

GAS BLANKETED LIQUID STORAGE SYSTEM, GAS PRESSURE REGULATION DEVICE, COUNTERSPRING REGULATOR AND PROCESS FOR GAS BLANKETING A LIQUID STORAGE VESSEL

BACKGROUND OF THE INVENTION

1. Field of the Invention

The present invention relates to a system, device, regulator and process for use in pressurizing a vessel where the vessel is to be pressurized with a positive gauge pressure having a pre-selected value.

2. Description of the Related Art

Richard, Jr., U.S. Pat. No. 4,274,440, issued Jan. 23, 1981, discloses a pressure gas regulation system. The system employs a lead weight (see col. 3, lines 21-24) which renders the system orientation sensitive. In other words, the system is dependent on gravitational forces to act upon the lead weight in the desired direction, and thus the system is not orientation insensitive, and must be oriented in the specified position so that the lead weight will act in the appropriate direction. This orientation sensitivity renders the system to the risk of failure if the system is improperly oriented, and creates inconvenience to the user/installer who must position the system in the required orientation for it to perform as design. Additionally, the systems employing a weight force may not provide the desired level of sensitivity for very fine positive pressure maintenance. Additionally, the system of the U.S. Pat. No. 4,274,440 discloses the use of a orifice which can very from a number 80 drill size up to a number 65 drill size. Such single hole orifices can experience problems such as clogging, which can render the system inoperative.

Accordingly, there is a need to provide a gas blanketed liquid storage system, gas pressure regulation device, and regulator which is not position sensitive, which exhibits enhanced levels of pressure sensitivity, and which overcomes the problems associated with single hole restricted flow orifices.

SUMMARY OF THE INVENTION

The gas blanketed liquid storage system includes a gas supply tank, a gas pressure regulation device and a vessel. The gas pressure regulation device has a container which contains gas at a pressure intermediate to that of the gas supply tank and the vessel. An inlet line provides gaseous communication between the gas supply tank and the container, and a high pressure reducing regulator controls flow therein to maintain the pressure in the container at a pre-selected intermediate pressure. The device also contains a series of regulators which control gas flow from the container to the vessel in response to vapor pressure changes in the vessel. The series of regulators includes a counterspring regulator which responds to pressure changes in the vapor phase of the vessel, and which opens and closes a control chamber in a diaphragm regulator which controls flow from the container to the vessel. A restricted flow tube permits low volume flow of intermediate pressure gas from the container to the control chamber, and thereby permits slow pressure build up in the diaphragm regulator when the valve of the counterspring regulator is closed. When pressure in the control chamber is below a predetermined set point, the diaphragm regulator opens the valve controlling flow from the container to the vessel, and when the pressure in the control chamber is above the predetermined set point, then the diaphragm regulator closes the valve prohibiting flow from the container to the vessel.

The system, device, regulator and process, are not functionally dependent upon the orientation of the counterspring regulator, which may be oriented in any desired orientation. Additionally, the counterspring system can provide for greater sensitivity than is typically provided by a single spring/counterweight systems, due in part to the force of the spring being compression dependent, whereas the force of the weight is uniform across its vertical path of movement. Additionally, the system provides a flow restricted passage which is relatively larger and which is thus less susceptible to clogging from single contaminate pieces which have a cross section greater than the diameter of a conventional single hole orifices.

DETAILED DESCRIPTION OF THE INVENTION

Figure 1:
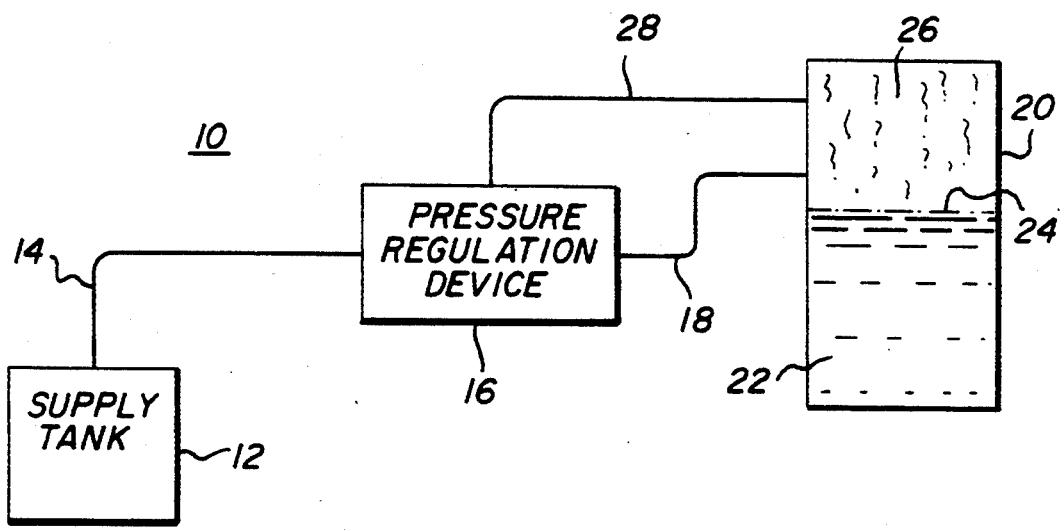
FIG. 1 is a schematic representation of a gas blanketed liquid storage system.

In FIG. 1, a gas blanketed liquid storage system (10) is shown. The system (10) includes a gas supply tank (12) which furnishes a supply of gas at a gas supply pressure typically greater than 50 psig, for example, between 50 psig and 1,500 psig, and more typically between 100 psig and 1,000 psig, and more typically between 250 psig and 750 psig. The gas supply tank (12) typically contains a supply of blanketing gas, which is preferably free of diatomic oxygen, and more specifically is preferably selected from nitrogen and helium, and most preferably is nitrogen. The gas supply tank (12) is connected through inlet line (14) to gas pressure regulation device (16). The inlet line (14) serves as a means for pressurized gaseous communication between supply tank (12) and the device (16) to permit flow of pressurized gas from the supply tank (12) to the device (16).

Figure 2:
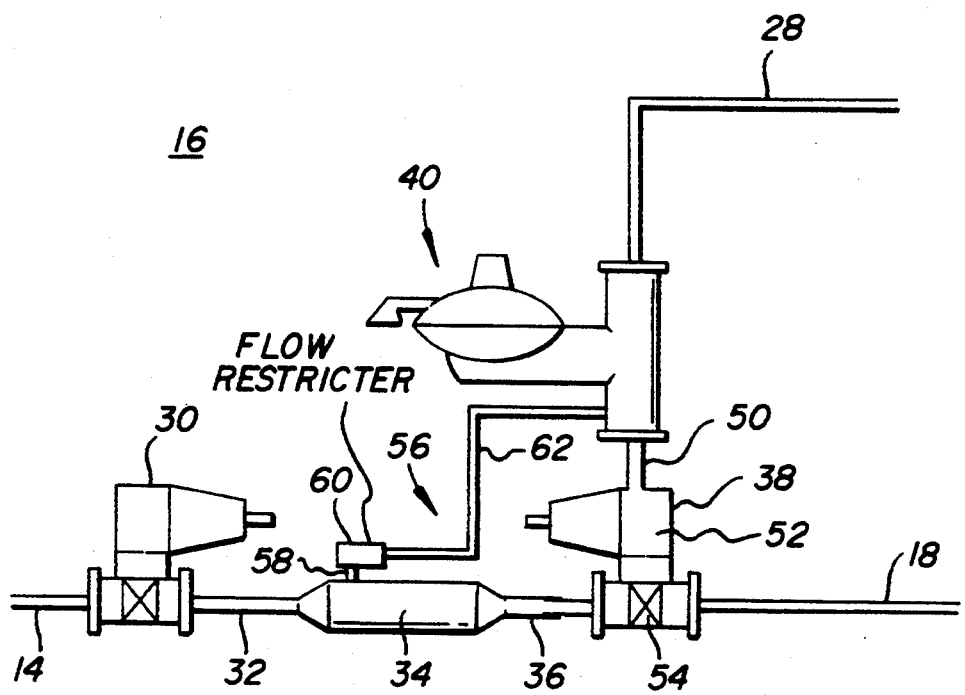
FIG. 2 is a schematic representation of a gas pressure regulation device.

The device (16), as shown in FIG. 2, reduces the gas pressure to an intermediate gas pressure, preferably between a gauge pressure of 20 inches of water and 40 pounds per square inch, more preferably between 5 pounds per square inch and 20 pounds per square inch, and most preferably between 7 pounds per square inch and 15 pounds per square inch gauge pressure. Intermediate pressure gas then flows from the device (16) through outlet line (18) to storage vessel (20). Storage vessel (20) may be simply a vessel for storing a blanketing gas, such as a computer housing wherein a positive gas pressure is desired to prevent the infiltration of dust from the atmospheric air into the computer housing, but preferably the storage vessel is a liquid storage vessel which employs a blanketing gas to prevent the infiltration of atmospheric oxygen into the storage vessel and which utilizes the gas pressure regulation device as a means for monitoring vapor leaks from the storage vessel (20) for environmental monitoring purposes. The preferred storage vessel (20) contains a liquid phase (22) having an upper liquid surface (24), and contains a vapor phase (26). The system (10) is designed to maintain a pre-selected positive gauge pressure in the vapor phase (26), and preferably that pre-selected positive gauge pressure is between 0.01 inches of water and 10 inches of water column, more preferably between 0.1 inches of water and 3 inches of water, and most preferably between 0.3 inches of water and 1 inch of water column gauge pressure. Vapor then flows from the vapor phase (26) through sensing line (28) to device (16).

Device (16) senses the pressure in vapor phase (26) through sensing line (28), and when the vapor pressure in vapor phase (26) drops below the pre-selected positive gauge pressure, then device (16) permits the flow of gas from device (16) through outlet line (18) into storage vessel (20). Device (16) contains a volume of intermediate pressure gas, and when the pressure of the intermediate pressure gas falls below a predetermined intermediate gauge pressure level, then device (16) allows gas to flow from supply tank (12) through inlet line (14) into device (16) to resupply device (16) with pressurized gas.

Once the pressure of gas in vapor phase (26) reaches the pre-selected positive gauge pressure, then gas pressure regulation device (16), smoothly and gently, but quickly and responsively, stops the flow of intermediate pressure gas from device (16) through outlet line (18) to storage vessel (20). Once flow from device (16) has stopped, the volume of gas contained in device (16) is permitted to maintain its predetermined intermediate pressure level, and device (16) stops the flow of gas from supply tank (12) through inlet line (14) into device (16).

The gas pressure regulation device (16) comprises a high pressure reducing regulator (30) for receiving gas from inlet line (14), and for controlling the flow of gas from supply tank (12) through inlet line (14) into a connecting line (32) for flow of gas into a container (34) which preferably functions as a surge suppressor. The high pressure reducing regulator (30) controls the flow of gas from supply tank (12) into container (34) in response to the pressure in container (34). The regulator (30) has a pre-selected set point which opens the regulator's valve (not shown) when the gas pressure in container (34) drops below the predetermined set point value, thereby permitting high pressure gas from tank (12) to flow into container (34) thereby permitting the pressure in container (34) to rise. Once the pressure in container (34) has risen above the predetermined value, then the regulator (30) closes its valve thereby preventing flow of gas from supply tank (12) to container (34).

Figure 3:
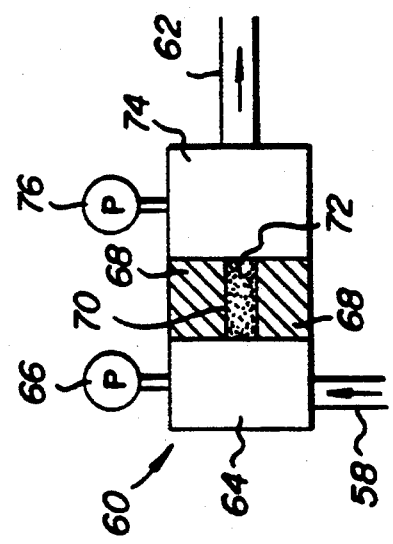
FIG. 3 is a cross sectional view of a flow restricter.
Figure 4:
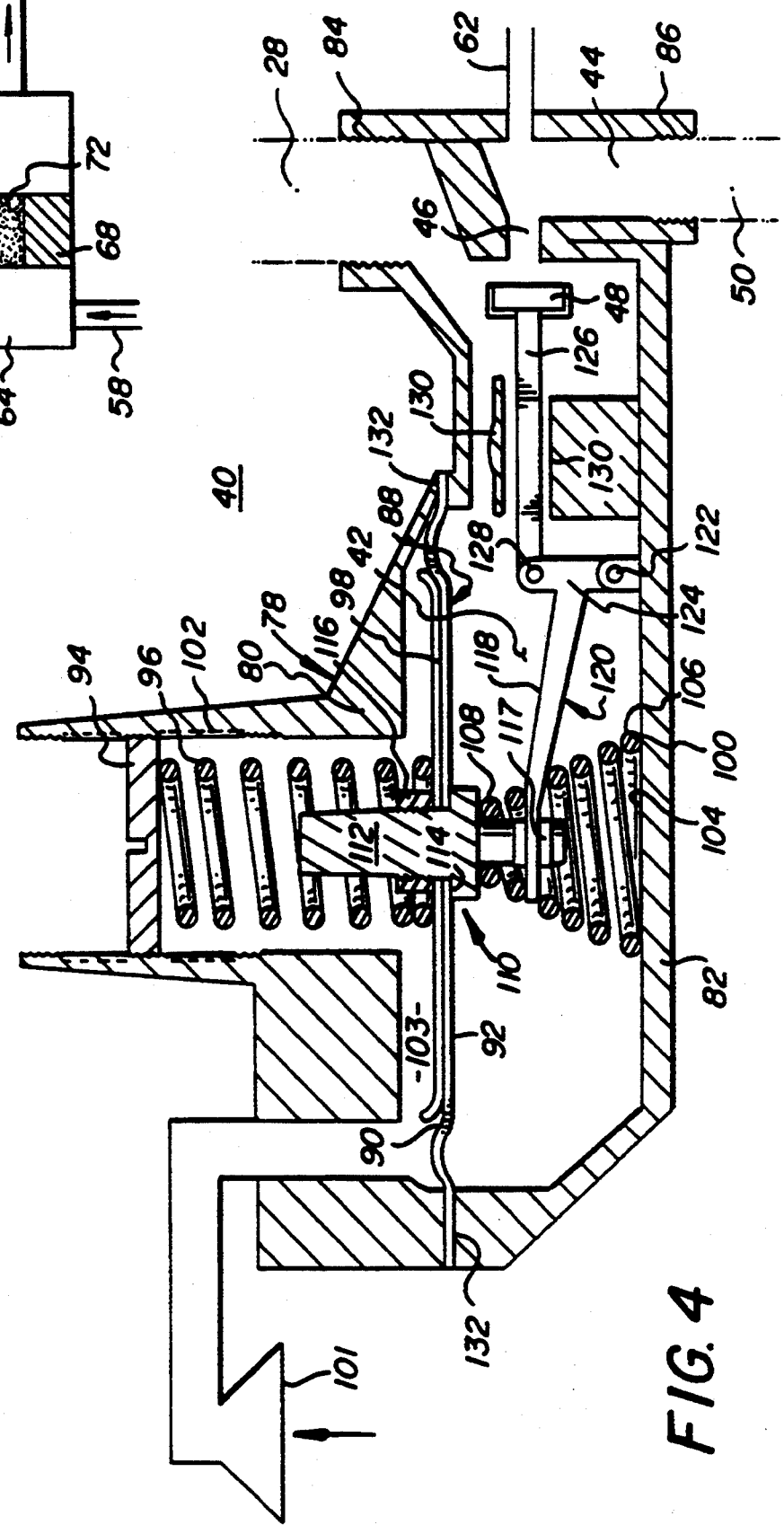
FIG. 4 is a cut away view of a counterspring regulator.

Gas then flows from container (34) into intermediate pressure line (36) into outlet line (18) and then into storage vessel (20). The device includes a pressure responsive regulator (38) which includes a valve (not shown) disposed between intermediate pressure line (36) and outlet line (18) for controlling the flow of intermediate pressure gas therebetween. In other words, the pressure responsive regulator (38) controls the flow of gas from the container (34) to the storage vessel (20). The device (16) further includes a counterspring regulator (40) which is described in more detail below, and which includes, as shown in FIG. 4, a sensing chamber (42) and a control chamber (44) which are interconnected by a relief port (46) which is opened and closed by a valve seat (48) in response to the gas pressure in the sensing chamber (42). The sensing chamber (42) is in gaseous communication with the vapor phase (26) of the storage vessel (20) through sensing line (28). The counterspring regulator (40) is set at a pre-selected pressure set point such that when pressure in the sensing chamber (42) (and correspondingly in the vapor phase (26) of the storage vessel (20)) drops below the pre-selected set point, then relief port (46) is opened allowing gas from control chamber (44) to escape into sensing chamber (42) thereby substantially reducing the gas pressure in control chamber (44). Control chamber (44) is in gaseous communication with pressure responsive regulator (38) through conduit (50) such that when the gas pressure in control chamber (44) drops, then gas flows from internal chamber (52) of pressure responsive regulator (38) to control chamber (44) resulting in a corresponding pressure drop in said internal chamber (52) thereby causing pressure responsive regulator (38) to open an outlet valve (54) disposed between intermediate pressure line (36) and outlet line (18) thereby permitting intermediate pressure gas to flow from container (34) into storage vessel (20). After a sufficient volume of intermediate pressure gas has flowed into storage vessel (20) thereby raising the gas pressure in vapor phase (26), and correspondingly in sensing chamber (42), sufficiently to actuate counterspring regulator (40) to close valve seat (48) against relief port (46), then gas will be prevented from escaping from control chamber (44) into sensing chamber (42). Control chamber (44), and consequently internal chamber (52), are in restricted flow gaseous communication with container (34) through restrictive flow tube (56). Restrictive flow tube (56) is best shown in FIG. 3, and includes a first tubular segment (58), a flow restricter (60), and a second tubular segment (62). Gas flows from container (34) into first tubular segment (58), then into flow restricter (60) which limits the rate of gas flow there-through, and then into second tubular segment (62) and then into control chamber (44), and consequently into internal chamber (52). By restricting the flow of intermediate pressure gas from container (34) into internal chamber (52) of pressure responsive regulator (38), the smooth and efficient closing of outlet valve (54) can be achieved, thereby minimizing the shock and vibration, and hammering effect, to container (34) as the flow of gas therefrom is being curtailed. The pressure responsive regulator (38) is preferably a diaphragm regulator and opens the outlet valve (54) when the pressure in internal chamber (52) falls below a preset value, and closes outlet valve (54) when the pressure in internal chamber (52) exceeds the preset value. The preset value for actuation of pressure responses regulator (38) is less than the predetermined value for actuation of high pressure reducing regulator (30) and substantially greater than the preselected value for actuation of counterspring regulator (40). Flow restricter (60) comprises a first throat (64) which preferably has a first pressure gauge (66) attached thereto for measuring the gas pressure in the first throat (64), and consequently measuring the gas pressure in container (34). The flow restricter (60) further includes an internal collar (68) which has a reduced cross section passage (70) therethrough which contains a sintered metal structure (72) therein. The sintered metal structure (72), is preferably made of a sinterable metal, such as aluminum, and effectively restricts the rate of flow of gas through the passage (70). A critical advantage of utilizing the sintered metal structure (72) is that it permits the diameter of the passage (70) to be larger than an entirely open hole such as taught in U.S. Pat. No. 4,274,440. Suitable diameters for the cylinderical structure (72) are 0.15 inches to 0.75 inches, and more preferably between 0.2 and 0.5 inches, most preferably between 0.2 and 0.3 inches in diameter, and between 0.2 and 1.0 inches in length, more preferably between 0.25 and 0.5 inches in length. By permitting the passage (70) to be of a relatively large diameter compared to a entirely open hole, the risk of entire blockage of the passage by a single small diameter contaminant, such as a paint chip or metal flake, is reduced. The sintered metal structure may be easily cleaned by counter flow of gas through the structure to blow out any small contaminants. Intermediate pressure gas flowing through the passage (70) and the structure (72), then enters a second throat (74), and then into the second tubular segment (62). Preferably the flow restricter (60) has a second pressure gauge (76) which measures and monitors the pressure in second throat (74), and consequently the pressure in control chamber (44) and internal chamber (52). The restricter flow tube (56) sufficient restricts the rate of gas flow into control chamber (44) so that counterspring regulator (40) is not actuated by the flow of gas from the tube (56). In other words the flow through tube (56) is insufficient to raise the pressure in sensing chamber (42) when port (46) is open.

The counterspring regulator (40), as shown in FIG. 4, comprises an external housing (78) which includes an upper housing portion (80) and a lower housing portion (82). The terms upper and lower are meant only to distinguish the relative portions of the housing, and not meant to indicate that any particular orientation is necessary for proper function of the counterspring regulator (40). The counterspring regulator (40) has the control chamber (44) and the sensing chamber (42) in gaseous communication with each other through the relief port (46) which is opened and closed by valve seat (48). A first threaded orifice (86) threadably connects with one end of conduit (50) for gaseous communication between control chamber (44) and conduit (50). A second threaded orifice (84) is threadably disposed for connecting with an end of sensing line (28) for gaseous communication between sensing line (28) and sensing chamber (42). The counterspring regulator (40) further includes a rubber-like diaphragm (88) having an atmospheric pressure side (90) and a sensing chamber pressure side (92). The counterspring regulator (40) further includes an adjustable plug (94), a first coil compression spring (96), a plate (98), and a second conical shaped coil compression spring (100). The first coil compression spring (96) is disposed and compressed between the plug (94) and the plate (98). The plate (98) is adjacent to and in contact with the atmospheric side (90) of the diaphragm (88). In other words, the first coil compression spring (96) forcibly engages the plate (98) applying force against the diaphragm (88) towards the sensing chamber (42). The atmospheric pressure likewise applies pressure and force against diaphragm (88) on the atmospheric pressure side (90) of the diaphragm (88) thereby forcing the diaphragm (88) toward the sensing chamber (42). Atmospheric air can enter atmospheric opening (101) into atmospheric chamber (103) to exert atmospheric pressure on side (90) as indicated above. The plug (94) is threadably received within an elongated threaded annular plug recess (102) for adjustment of the compressive force of the first compression spring (96) against the diaphragm (88) by relative movement of the plug (94) along and within the recess (102). Conical compression spring (100) is disposed between the sensing chamber pressure side (92) of the diaphragm (88) and a base (104) of lower housing portion (82). The conical coil compression spring (100) has a lower wide end (106) which preferably has an cross-sectional area of at least two times that of the cross sectional area of the upper end (108) of the compression spring (100). This conical shape of the spring (100) provides a stable orientation for the spring during actual use of the counterspring regulator (40). Use of a conical spring prevents the lower end (106) of the spring (100) from slipping away from the base (104) thereby rendering the regulator inoperative.

The upper end (108) of the spring (100) may be in direct contact with the diaphragm (88) or may be indirectly engaged with the diaphragm (88) through an intermediate member (110). Preferably an intermediate member (110) is employed which is connected to the plate (98). Preferably member (110) has a stem (112) which extends through plate (98) and diaphragm (88), and is held thereto by compressive forces between a lip (114) which extends radially out beyond stem (112) on the sensing chamber side of stem (112), and a nut (116) threadably engages the atmospheric side of stem (112), and sealably and compressibly holds member (110) in position relative to plate (98) and diaphragm (88) for movement with plate (98) in response to movement of diaphragm (88). The lower end of member (110) preferably has a holding opening (117) which slidibly receives long lever arm (118) of lever (120) for forcibly actuating lever (120) and forcing it to rotate about pivot (122). Lever (120) is preferably t-shaped with the long lever arm (118) being rigidly connected to an intermediate portion of cross arm (124). A lower end of cross arm (124) being pivotly connected to pivot (122) which is rigidly attached to lower housing portion (82). The upper portion of cross arm (114) is pivotly connected a valve stem (126) at a pivot (128). Valve stem (126) is slidibly received for linear (horizontal) movement within a sleeve (130). The other end of stem (126) is rigidly attached to valve seat (48). The lever arm (118) is preferably at least three times longer than the cross arm (124), and preferably provides a mechanical leverage advantage of at least 2:1, preferably 3:1, and more preferably at least 5:1, for the net forces on the diaphragm (88) over the net resistant forces on the counterspring regulator's valve seat (48).

Diaphragm (88) is sealably engaged between upper housing portion (80) and lower housing portion (82) around perimeter (132) of diaphragm (88).

The system may be also set out in means type language, wherein the gas supply tank (12) is a means for supplying high pressure gas; and inlet line (14), is a means of gaseous communication between means (12) and gas pressure regulation device (16). The storage vessel (20) may be defined as means for storing a gas having a positive gauge pressure, and more specifically may be defined as a means for storing a liquid phase and a vapor phase wherein the vapor phase has a positive gauge pressure. The sensing line (28) may be defined as means for gaseous communication between the vapor phase (26) and the sensing chamber (42) of device (16). The outlet line (18) may be defined as means for gaseous communication from the container (34) of gas regulating device (16) to the storage vessel (20). The gas pressure regulation device may be broadly defined as means for regulating the flow of gas from supply tank (12) to storage vessel (20) in response to the vapor pressure in the vapor phase (26) of storage tank (20). The plug (54) and recess (102) may be referred to as means for adjusting the relative spring forces. The lever (120), plate (98) and member (110) may be referred to as means for moving the valve stem (112) and seat (48) in response to movement of the diaphragm (88).

I claim:

1. A gas blanketed storage system comprising:
   (a) a storage vessel containing a vapor phase,
   (b) a supply tank containing a blanketing gas at a gauge pressure greater than 50 pounds per square inch,
   (c) a gas pressure regulation device in gaseous communication with said vessel and said tank for regulating a flow of gas from said tank to said vessel, said device comprising
      (i) a container containing a volume of gas having a predetermined intermediate gauge pressure of between 20 inches of water column and 40 pounds per square inch,
      (ii) a high pressure reducing regulator, said container and said tank being in gaseous communication through a valve controlled by said reducing regulator, said reducing regulator opening said valve when the pressure in said container is below a predetermined pressure, said regulator closing said valve when the pressure in said container is above a predetermined pressure,
      (iii) a counterspring regulator comprising
         (A) a sensing chamber in gaseous communication with said vapor phase of said vessel for exposing the sensing chamber to the gas pressure of said vapor phase,
         (B) a diaphragm having one side exposed to atmospheric pressure and having another side exposed to the gas pressure in said sensing chamber,
         (C) a first spring applying compressive force to the atmospheric pressure side of said diaphragm,
         (D) a second spring applying compressive force to the sensing chamber pressure side of said diaphragm,
         (E) a control chamber,
         (F) a port providing gaseous communication between said control chamber and said sensing chamber,
         (G) a valve connected to said diaphragm for opening and closing said port in response to movement of said diaphragm, said valve opening when the gas pressure in said sensing chamber falls below a pre-selected value, said valve closing when the gas pressure in said sensing chamber rises above a pre-selected value,
      (iv) a pressure responsive regulator, said container and said vessel being in gaseous communication through a valve controlled by said responsive regulator, said responsive regulator having an internal chamber in gaseous communication with said control chamber, said responsive regulator opening said valve when the pressure in said internal chamber falls below a predetermined level, said responsive regulator closing said valve when the pressure in said internal chamber rises above a predetermined level, said internal chamber being in gaseous communication with said container through a restricted flow passage, said internal chamber having a pressure below the predetermined level when said port is open, the pressure in said internal chamber being able to rise to above the predetermined level when the port is closed as gas flows from the container to the internal chamber.

2. The system of claim 1 wherein said blanketing gas is nitrogen.

3. The system of claim 1 wherein said second spring has a conical shape with a wide end engaged with a portion of a housing for the counterspring regulator, and having a narrow end adjacent said diaphragm.

4. The system of claim 1 wherein said restricted flow passage contains sintered metal for restricting the flow of gas through said passage.

5. A gas pressure regulator device comprising:
   (a) a container for containing a volume of gas having a pre-selected gauge pressure of between 20 inches of water column and 40 pounds per square inch, said container having an inlet, a first outlet, and a second outlet,
   (b) a high pressure reducing regulator for regulating the flow of gas from a high pressure supply to said container, said high pressure reducing regulator having a valve which permits a flow of gas into said inlet from said supply when the gas pressure in said container is below a predetermined level, said pressure reducing regulator preventing the flow of gas from said supply into said inlet when the gas pressure in said container is above a predetermined level,
   (c) a counterspring regulator comprising
      (i) a sensing chamber,
      (ii) a control chamber,
      (iii) a valve for preventing and permitting gaseous communication between said sensing chamber and said control chamber,
      (iv) a diaphragm having one side exposed to atmospheric pressure and having another side exposed to the pressure in the sensing chamber,
      (v) a first spring applying force on said diaphragm in the direction of the atmospheric pressure force on said diaphragm,
      (vi) a second spring applying force on said diaphragm in the direction of the sensing chamber pressure force on said diaphragm,
      (vii) means for adjusting the relative spring forces,
      (viii) means for moving the valve in response to movement of the diaphragm, said valve closing when the pressure in said sensing chamber excesses a predetermined level, said valve opening when the pressure in said sensing chamber falls below a predetermined level,
   (d) a pressure responsive regulator comprising
      (i) an internal chamber in gaseous communication with said control chamber,
      (ii) a valve for preventing and permitting flow of gas from said container first outlet, said valve (dii) closing when the gas pressure in said internal chamber exceeds a preset value, said valve (dii) opening when the gas pressure in said internal chamber falls below the preset value,
   (e) a restrictive flow tube providing gaseous communication between said second outlet and said control chamber for allowing the pressure in said internal chamber to rise when said counterspring regulator valve is closed.

6. The device of claim 5 wherein said restricted flow to be comprise a flow passage containing a sintered metal structure for restricting the flow of gas through said passage.

7. The device of claim 5 wherein said diaphragm is made of a rubber material.

8. The device of claim 5 wherein said metal in an aluminum compound.

9. The device of claim 5 wherein said means for adjusting the relative compressive spring forces comprises a plug adjacent an end of the said first spring and opposite said diaphragm and selectively movable along a longitudinal axis perpendicular to said diaphragm.

* * * * *